United States Patent
Vadlakonda et al.

(10) Patent No.: US 8,483,098 B2
(45) Date of Patent: Jul. 9, 2013

(54) METHOD AND APPARATUS FOR CONFERENCE SPANNING

(75) Inventors: Sravan Vadlakonda, Sunnyvale, CA (US); Shantanu Sarkar, San Jose, CA (US); Ashish Chotai, Santa Clara, CA (US); Aseem Asthana, San Jose, CA (US); Glenn Inn, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 1726 days.

(21) Appl. No.: 11/288,690

(22) Filed: Nov. 29, 2005

(65) Prior Publication Data

US 2007/0121530 A1    May 31, 2007

(51) Int. Cl.
*H04L 12/16* (2006.01)
*H04Q 11/00* (2006.01)

(52) U.S. Cl.
USPC ............ 370/260; 370/265; 370/352; 345/1.1; 345/1.3

(58) Field of Classification Search
None
See application file for complete search history.

(56) References Cited

U.S. PATENT DOCUMENTS

| | | | |
|---|---|---|---|
| 5,325,194 A | 6/1994 | Natori et al. | |
| 5,999,208 A * | 12/1999 | McNerney et al. | 348/14.08 |
| 6,922,718 B2 | 7/2005 | Chang | |
| 7,412,392 B1 * | 8/2008 | Satapathy | 704/270.1 |
| 2003/0185369 A1 * | 10/2003 | Oliver et al. | 379/202.01 |
| 2005/0181815 A1 * | 8/2005 | Shostak | 455/519 |
| 2005/0271220 A1 * | 12/2005 | Bathurst et al. | 381/92 |

\* cited by examiner

*Primary Examiner* — Asad Nawaz
*Assistant Examiner* — Justin N Mullen
(74) *Attorney, Agent, or Firm* — Fish & Richardson P.C.

(57) ABSTRACT

Disclosed are conferencing systems, devices, architectures, and methods for managing a conference spanning system to facilitate participation in a plurality of conferences at the same time. An exemplary system having devices and/or structures in accordance with embodiments can include: (i) a plurality of conferences, each conference being configured to support a plurality of media modes; (ii) a presentation mechanism configured to support the plurality of media modes from the plurality of conferences; and (iii) a selector for selecting a conference from the plurality of conferences and designating the selected conference as an active conference and designating non-selected conferences as background conferences, wherein the active conference is assigned at least one enhanced media mode in the presentation mechanism.

31 Claims, 7 Drawing Sheets

METHOD AND APPARATUS FOR CONFERENCE SPANNING

BACKGROUND OF THE INVENTION

This invention is related in general to conferencing systems and more specifically to devices, systems, architectures, and methods of spanning a plurality of conferences.

In modern working life, it is typical to have conflicting meetings, such as two video or telephone conferences scheduled at overlapping times. In some cases, a person may only need passive participation in one or more of several meetings, while being able to actively participate in one meeting at a time. However, people can generally process multiple sets of information while focusing primary attention on only one thing at a time.

In some conventional approaches, audio-only or video-only monitoring of several locations can occur, but such monitoring is not done in a conferencing application. Accordingly, what is needed is a way of spanning a plurality of conferences by participating in some conferences in a passive manner and at least one in an active manner. In general, a person may need to be effectively present in more than one conference at the same time. In particular, a way of using different "modalities" or media modes of a conference to allow participation as well as to distinguish between multiple conferences using a given media mode is desirable.

DETAILED DESCRIPTION OF EMBODIMENTS OF THE INVENTION

Figure 1:
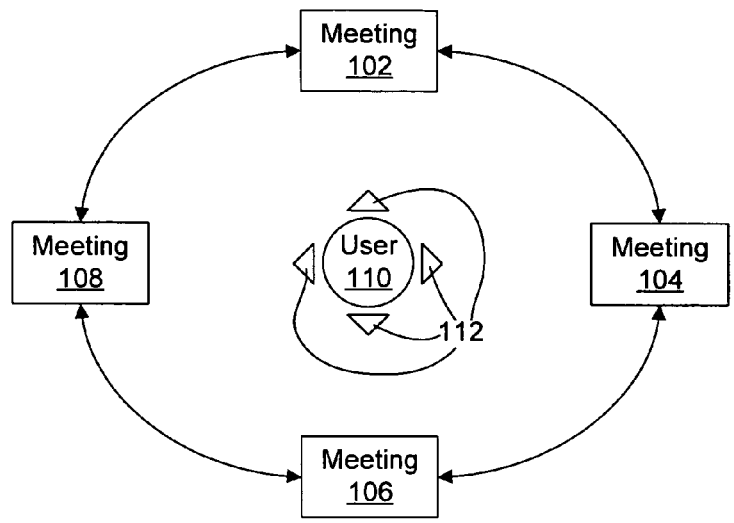
FIG. 1 is a block diagram illustrating an exemplary conference spanning spatial arrangement in accordance with embodiments of the present invention.

Embodiments of the present invention implement video conferencing architectures, structures, control systems, and/or methods for spanning a plurality of conferences. An exemplary system having devices and/or structures in accordance with embodiments can include: (i) a plurality of conferences, each conference being configured to support a plurality of media modes; (ii) a presentation mechanism configured to support the plurality of media modes from the plurality of conferences; and (iii) a selector for selecting a conference from the plurality of conferences and designating the selected conference as an active conference and designating non-selected conferences as background conferences, wherein the active conference is assigned at least one enhanced media mode in the presentation mechanism.

In general, any type of hardware, software or combination thereof can be used with aspects of embodiments of the invention. Further, any type of network and/or communication link can be used. Also, any type of media conferencing or the like, such as video, audio, and/or data may be used with aspects of embodiments of the invention.

For clarity, various well-known components, such as power supplies, some or portions of communications ports, routers, gateways, firewalls, and so on, have been omitted from the figures. However, those skilled in the art with access to the present teachings will know which components to implement and how to implement them to meet the needs of a given application.

In general, a conference spanning device, software, and/or system in accordance with embodiments of the present invention can include switch/routers or the like that may be configured with software to operate as spanning servers. Further, switch/routers or the like may be configured with software to operate as media switches to facilitate one of the conferences suitable for operation in the conference spanning system. Media switch functionality can include locally terminating video endpoint media and distributing incoming real time protocol (RTP) information based on conference policy, for example. Media can be forwarded between media switches and coordination between media switches can be provided by a controlling server, where the controlling server can be used to provide the initial conference arrangement.

Generally, aspects of embodiments of the present invention can allow for the spanning of a plurality of conferences by accommodating participation in some conferences in a passive manner and at least one in an active manner. In general, a participant may effectively be present in more than one conference at the same time. Further, different "modalities" or media modes of a conference to allow participation as well as to distinguish the multiple conferences using a given media mode can also be used in accordance with embodiments of the present invention. This is advantageous in a media (e.g., video, audio, text, and/or web components) conferencing system to: (i) increase productivity; and (ii) facilitate collaboration from multiple locales, for example.

Referring now to FIG. 1, a block diagram illustrating an exemplary conference spanning spatial arrangement in accordance with embodiments of the present invention is indicated by the general reference character 100. Conceptually, user 110 can be centrally located in the middle of four conferences or meetings, for example. In actuality, the user can be located in the same locale or a meeting room within one of meetings 102, 104, 106, or 108, for example. Or, the user can be located remotely from all of meetings 102, 104, 106, or 108, for example. In one aspect of embodiments of the present invention, a particular media mode (e.g., audio) can be used to give user 110 a sense of direction as to meetings 102, 104, 106, and/or 108, to provide distinction and ease of selection.

Selection between meetings 102, 104, 106, and 108 can be made by user 110 by way of selectors 112. Selectors 112 can be included in any appropriate type of user input device or user interface, such as a graphical user interface (GUI) or telephony user interface (TUI), for example. Selectors 112 can include a mechanism (e.g., a button or touchpad) for providing or activating a signal from the user input device to select an indicator, where the indicator can correspond to a conference. Such indicators can be displayed on a display screen, for example The conference or meeting (e.g., one of 102, 104, 106, and 108) selected by user 110 via selectors 112 can be in the foreground and may be referred to as an "active" conference. Other conferences in the system can remain in the background and user 110 may only have passive participation in these conferences. Further, a conference bridge (not shown) can be made aware by user 110 that user 110 is participating in more than one conference at the same time. User 110 can employ a set of messages to communicate (by way of selectors 112) the selection of an active conference to a conference server (not shown), for example. In this fashion, a user can participate (i.e., be actively or passively involved) in multiple conferences in accordance with embodiments of the present invention.

According to embodiments, "spatial" conferencing can be used to make it seem like the associated conferences are occurring in different rooms or locations. A spatial arrangement or direction of each of the conferences can correspond to the indicators and/or selectors 112. A user or participant can typically hear or otherwise monitor other conferences in the background. If a participant wants to talk in one of those background conferences, the participant (e.g., user 110) can bring that background conference into the foreground (e.g., make active), and then talk. When a background conference comes into the foreground, the voice component of the new active conference can be enhanced and the last active conference voice can be reduced to "background" noise. In one embodiment, multiple voices per conference can be heard by the user in the spatial arrangement. Further, this spatial arrangement may be enhanced in some applications by the use of headphones as an output device. In other applications, a particular room, such as one specially outfitted with surround sound and/or a designated seating position can be employed to accommodate a spatially arranged output device.

In accordance with embodiments, "rich" media or a full selection of media types (e.g., more than just audio and video media modes or components, but rather audio, video, text messaging, etc.) can be supported. Also, in one embodiment, a continual cycling through of meetings 102, 104, 106, and 108, to active meeting status can occur. Such an approach, which may be particularly useful for security purposes or for a manager wanting to quickly drop-in on several subordinate meetings, can be based on a timer to allow each meeting a designated amount of time as the active meeting. Further, user 110 may be able to delay the automatic jumping to the next active meeting and instead may extend a current meeting active status (e.g., override the automatic timer) if maintaining the current meeting as active for a longer period is desired.

Figure 2:
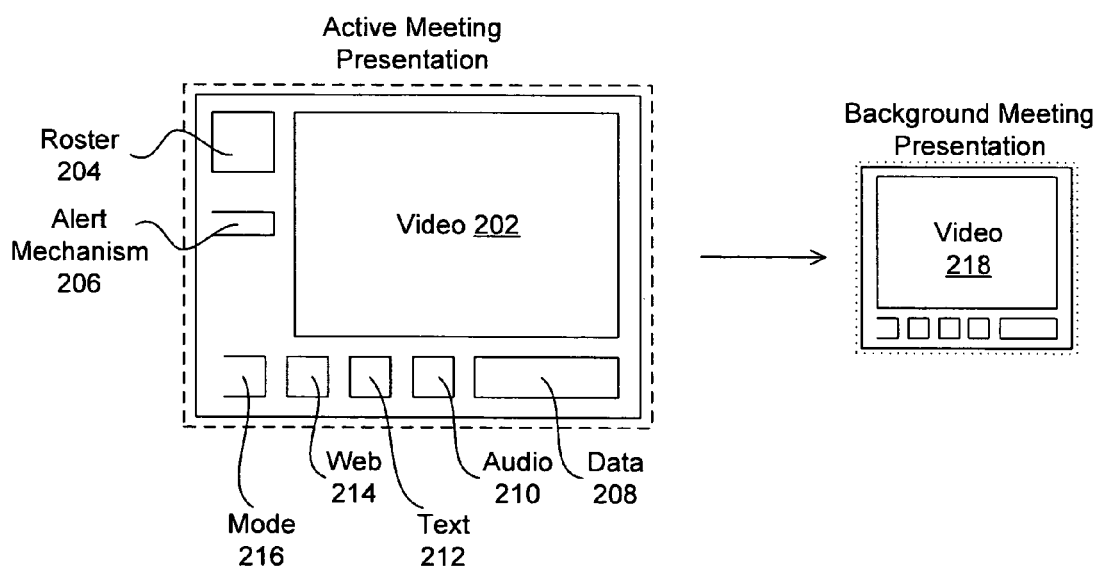
FIG. 2 is a block diagram illustrating exemplary active and background meeting presentations in accordance with embodiments of the present invention.

Referring now to FIG. 2, a block diagram illustrating exemplary active and background meeting presentations in accordance with embodiments of the present invention is indicated by the general reference character 200. In the active meeting presentation (e.g., by way of a presentation mechanism or output device), a larger view can be seen, perhaps by showing elements, such as video 202, roster 204, alert mechanism 206, data 208, audio 210, text 212, web 214, and mode 216, as compared to the smaller view of the background meeting presentation, including video 218, for example. The relative size of each element (e.g., video 202, roster 204, alert mechanism 206, data 208, audio 210, text 212, web 214, and mode 216) within the presentation may be configured by the user. Further, the background meeting presentation may be configured to emphasize one particular element from a total group of elements (e.g., video 218). In one embodiment of the present invention, the output device can include a display screen also used for selecting the active meeting. In other embodiments, the output device can be a separate device from the display screen.

Generally, the boxes shown in the example of FIG. 2 may be implemented as iconic or using a picture-in-picture (PIP) type of approach for the presentation of the other conferences. Alternatively, different quadrants of the screen can be designated for each conference, for example. Roster 204 can show a list of users who are in multiple meetings, for example. Accordingly, if someone is only passively participating, alert mechanism 206 can be used to wake that user up and request active participation in a given meeting (e.g., via a "wakeup" button). The alert may be experienced through one or more of the user's presentation elements, for example. Other notification approaches suitable for use in accordance with embodiments of the present invention will be discussed in more detail below. In general, an active meeting presentation can include full audio, full size video, and data conferencing, for example. In contrast, a background meeting presentation can include less emphasized audio and smaller presentation of video and data conferencing, for example.

A conference control application can adjust the audio gain of the active conferences in such a way that the active conference is heard in the foreground and the other conferences are heard in the background. In order to make such conversations intelligible, all the voice streams of conferences (e.g., meetings 102, 104, 106, and 108 of FIG. 1) can be spatially divided (e.g., one direction per conference). As discussed above with reference to FIG. 1, selectors 112 can be used to choose the active conference by way of a user input device, for example.

Further, selectors 112 can coincide with the spatial division of meetings 102, 104, 106, and 108. For example, a clock-like selection may be provided to essentially divide the conferences into separate sectors of a circle, as shown in FIG. 1. In one particular example, if there are four available conferences in a system at one time and if user 110 is conceptually located in the center of the circle, the four conferences can be placed at 0, 90, 180, and 270 degrees relative to user 110. In another example in accordance with embodiments of the present invention, conferences can be conceptually located in a plurality of a three dimensional radial locations. If there are only two available conferences, each conference can be conceptually placed at 0 degrees and 180 degrees relative to user 110, for example. In this fashion, a user can have a sense of direction relative to each available conference. Further, a selection mechanism (e.g., selectors 112) can coincide with the conceptual conference locations by use of an interface (e.g., GUI or TUI) configured to enhance a media mode or component (e.g., voice) from a conference in that direction.

Figure 3:
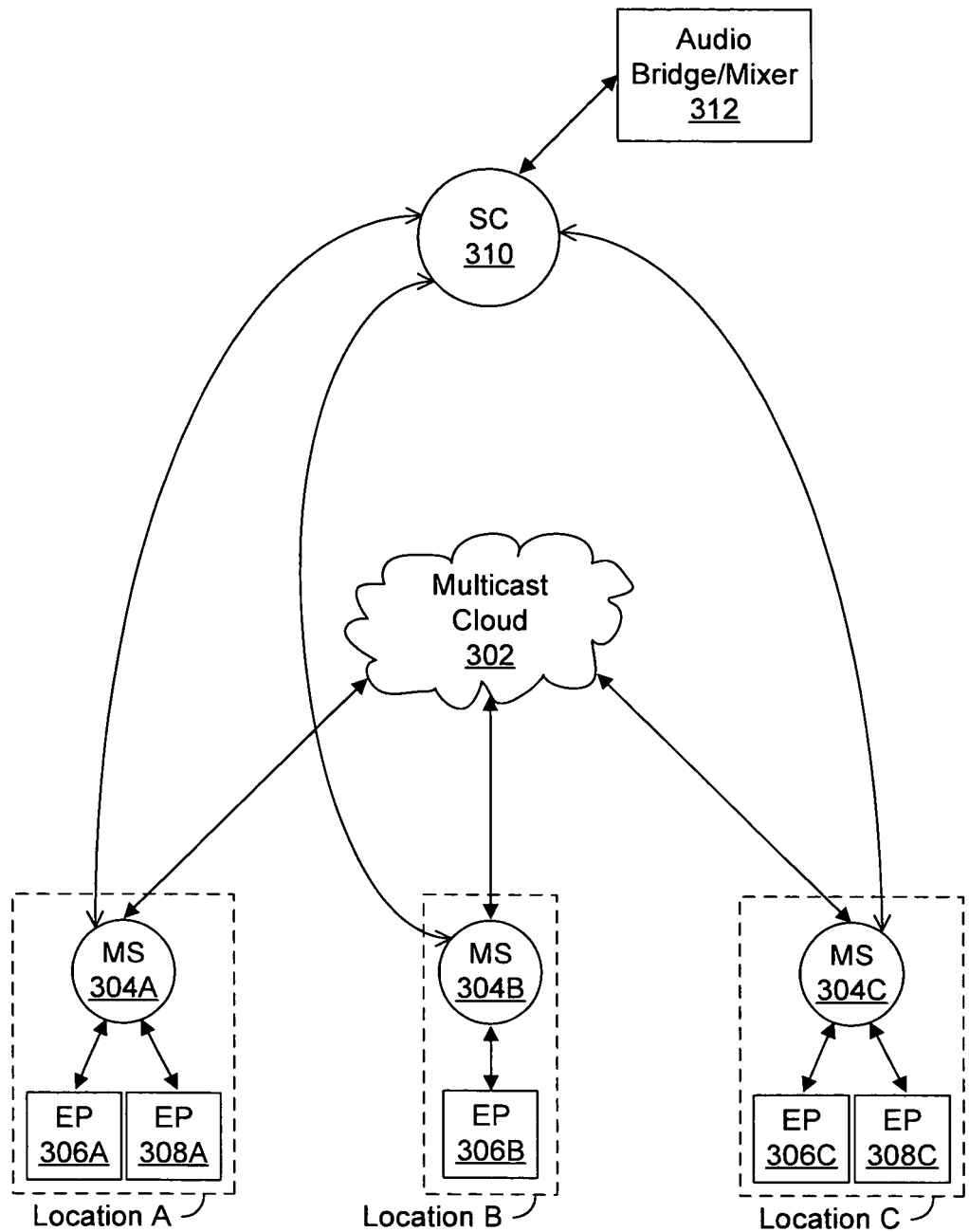
FIG. 3 is a block diagram illustrating an exemplary endpoint and stream controller arrangement in a conference suitable for use in accordance with embodiments of the present invention.

Referring now to FIG. 3, a block diagram illustrating an exemplary endpoint and stream controller arrangement in a conference suitable for use in accordance with embodiments of the present invention is indicated by the general reference character 300. System 300 can represent meeting 102, 104, 106, and/or 108, of FIG. 1, for example. In FIG. 3, media switches (e.g., MS 304A, 304B, and 304C) may be switch/routers that can be located in branch offices, for example. Audio bridge/mixer 312 and stream controller (SC) 310 may be located in a main office, for example. Further, base switch/ routers can be configured by using software to operate as a media switch or a stream controller in a particular application.

Stream controller (SC) 310 may be an entity (e.g., a switch/router configured by software to operate as a stream controller) that generally knows all of the participants in a video conferencing session, which endpoint is an active speaker, which endpoint is a previous/last speaker, etc. Accordingly, SC 310 can notify the media switches (e.g., MS 304A, 304B, and 304C) that a specific endpoint (e.g., 306A, 308A, 306B, 306C, or 308C) is the active speaker, and instruct the owning media switch to send that stream out via multicast cloud 302. Further, SC 310 can have the media switch associated with the previous speaker send that previous speaker stream to the new active speaker (e.g., by unicast instead of multicast).

A relationship between the media switches and the stream controller can be established by a controlling server (not shown in FIG. 3) upon set up of the video conference structure, participant locations, and the like. Further, audio bridge/mixer 312 can be used to convey to SC 310 that one of endpoints 306A, 308A, 306B, 306C, or 308C, is the new loudest speaker. SC 310 can then determine the location of X and which media switch is associated with EP X. For example, if the new loudest speaker is EP 306A or 308A, MS 304A can be identified; if the new loudest speaker is EP 306B, MS 304B can be identified; if the new loudest speaker is EP 306C or 308C, MS 304C can be identified. Once the proper media switch is identified, SC 310 can send a message (e.g., a signaling message using session initiation protocol (SIP)) to the appropriate media switch, notifying the media switch of the active speaker for conference 300.

Figure 4:
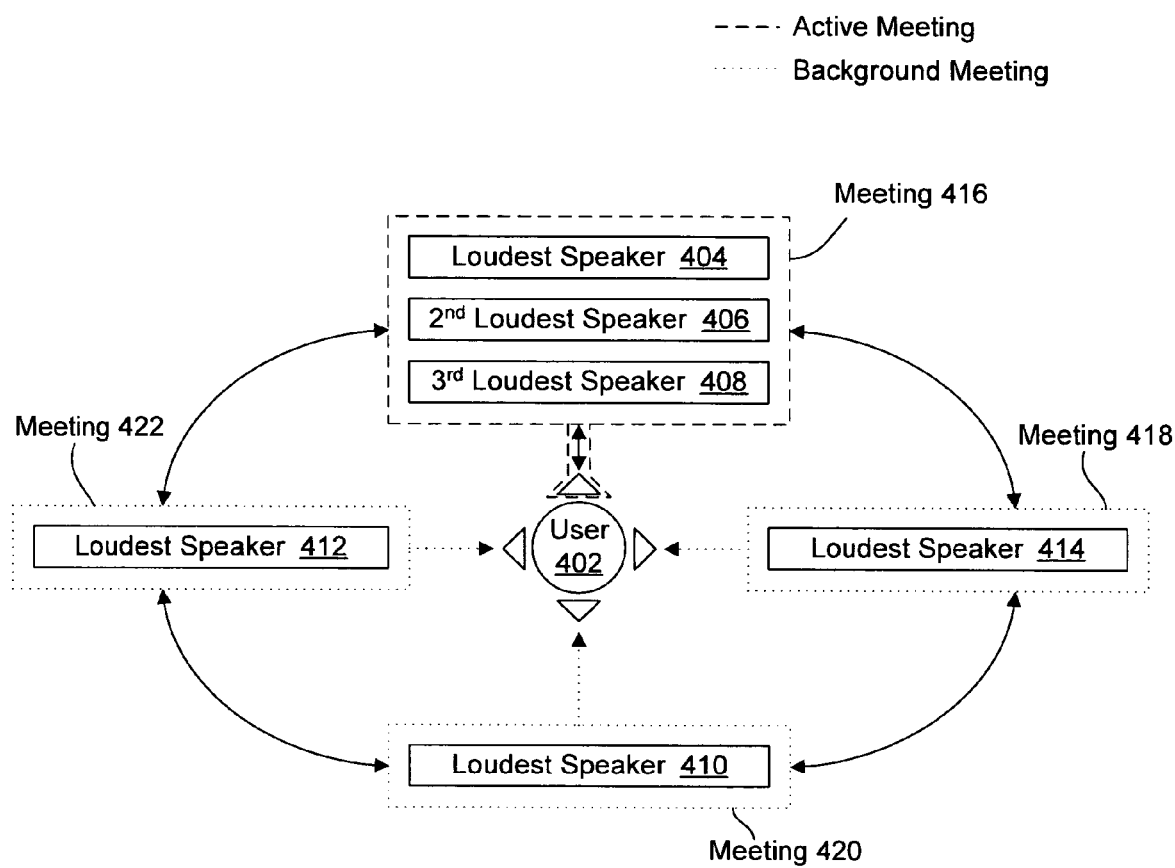
FIG. 4 is a block diagram illustrating an exemplary audio management in a conference spanning system in accordance with embodiments of the present invention.

Referring now to FIG. 4, a block diagram illustrating an exemplary audio management in a conference spanning system in accordance with embodiments of the present invention is indicated by the general reference character 400. In this example, the active conference can be meeting 416, while background conferences can be meetings 418, 420, and 422, as selected by user 402. Each of background meetings 418, 420, and 422 can send a less emphatic audio content, such as only one active or loudest speaker, or a reduced volume summation of the three current speakers in that conference, for example. Typically, at least the three most active speakers can be heard from one conference. However, in accordance with embodiments, user 402 can configure the meeting server (not shown) to filter out the second and third-most loudest speakers in the background conferences. This approach can limit the total number of voices that user 402 may have to process from up to 12 voices down to 6 or less.

Accordingly, in this particular example, active meeting 416 can provide loudest speaker 404, second loudest speaker 406, and third loudest speaker 408 to user 402. In contrast, background meeting 418 can only provide loudest speaker 414. Similarly, background meetings 420 and 422 can only provide loudest speakers 410 and 412, respectively. Alternatively, more than the top three loudest speakers from the active conference can be provided in other approaches in accordance with embodiments of the present invention. This mixing of only the loudest speakers from the background conferences with all, or the loudest three, speakers form the foreground or active conference, coupled with the spatial arrangement of the conferences discussed above, can facilitate identification and effective "tuning in" of a user listening to up to four conferences to a background conference of interest.

Figure 5:
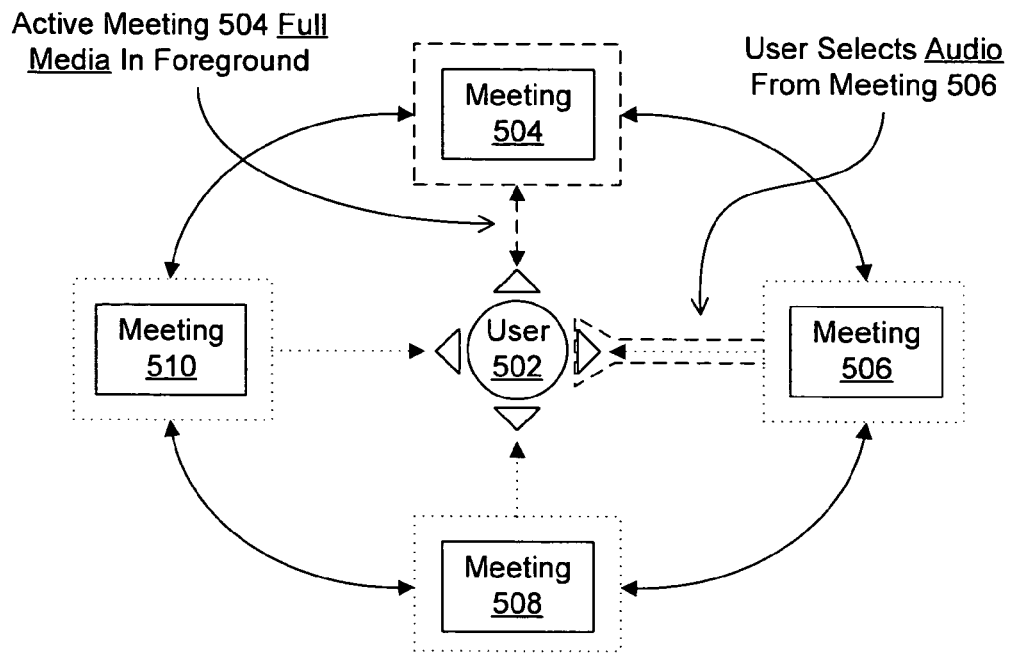
FIG. 5 is a block diagram illustrating an exemplary media selection for synchronization in accordance with embodiments of the present invention.

Referring now to FIG. 5, a block diagram illustrating an exemplary media selection for synchronization in accordance with embodiments of the present invention is indicated by the general reference character 500. Synchronization can be provided between media modes or components, such as video, audio, and web interfaces. User 502 can be associated with four conferences: meetings 504, 506, 508, and 510. If meeting 504 is the active conference, full media (e.g., video, audio, and web modes or components) can be enhance relative to background meetings 506, 508, and 510, and provided to user 502. User 502 may also have full 2-way interaction with meeting 504, as an active participant, for example. In accordance with embodiments, user 502 can select any one of the available media modes or components from one of the background meetings and the selected conference can be brought into the foreground and may become the new active meeting. In the particular example of FIG. 5, user 502 can select audio from meeting 506.

Figure 6:
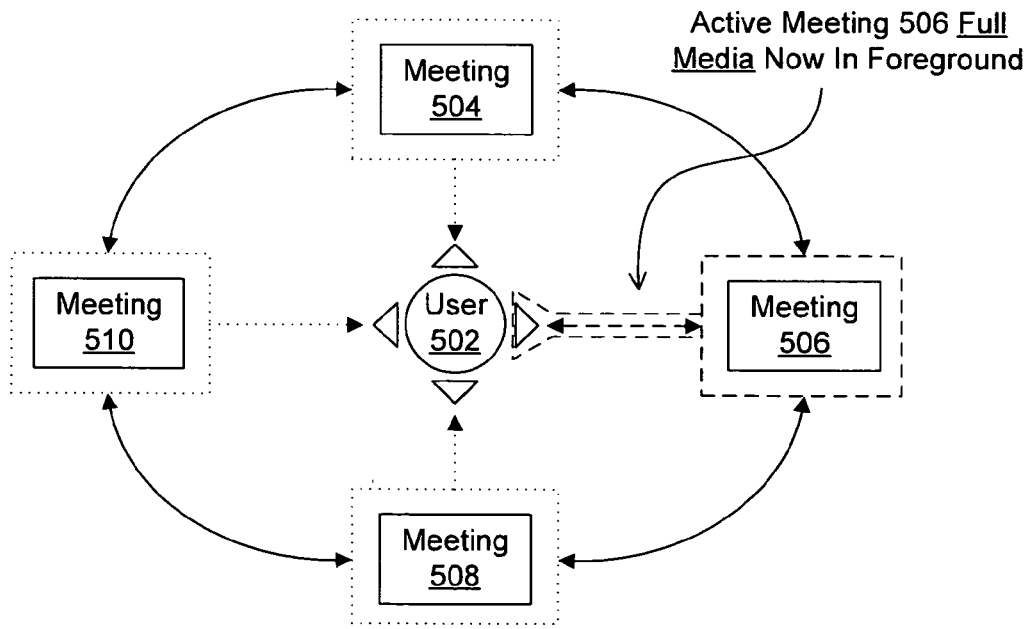
FIG. 6 is a block diagram illustrating an exemplary media synchronization approach in accordance with embodiments of the present invention.

Referring now to FIG. 6, a block diagram illustrating an exemplary media synchronization approach in accordance with embodiments of the present invention is indicated by the general reference character 600. As discussed above, user 502's selection can be made using a TUI (for voice components) or a GUI (for web/video components), for example. In this example, which is continued from FIG. 5, user 502 may select, via the audio component, meeting 506. Once the audio component is brought into the foreground, the conference server (not shown) may bring the other components of the selected conference (e.g., meeting 506) into the foreground as the new active conference for user 502. In the example of FIGS. 5 and 6, meeting 506 can then provide full available media to user 502 and can then be available for 2-way interaction as the active conference.

As another example, if a user brings a web component of a background conference into the foreground, the conference server can bring associate voice and video components of that conference (the new active conference) into the foreground. In this fashion, integration and synchronization of media modes or components of a conference, such as voice, video, audio, text, data, and web components, can be provided to an associated user.

Figure 7:
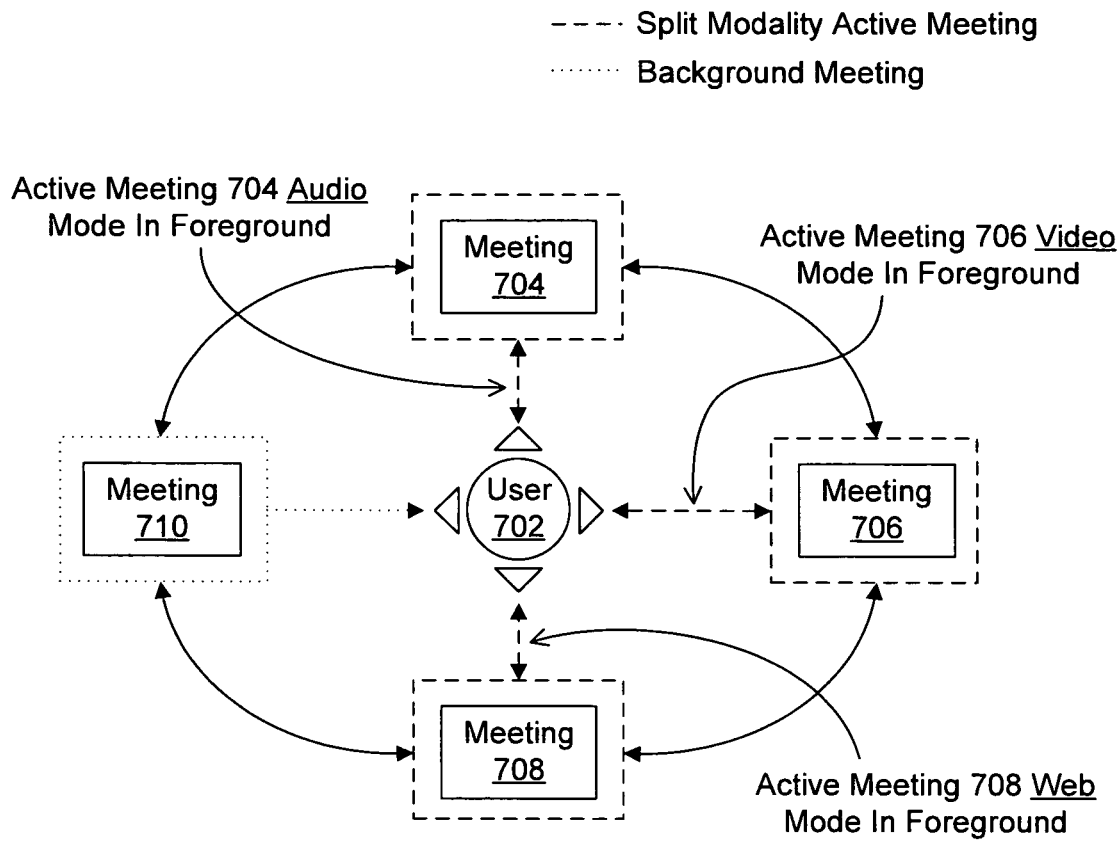
FIG. 7 is a block diagram illustrating an exemplary split modality operation in accordance with embodiments of the present invention.

Referring now to FIG. 7, a block diagram illustrating an exemplary split modality operation in accordance with embodiments of the present invention is indicated by the general reference character 700. User 702 can be associated with three active conferences (e.g., meetings 704, 706, and 708) and one background conference (e.g., meeting 710). User 702 can engage in active conferencing with three different conferences, for example, by "splitting" modalities between the active conferences. In this particular example, active meeting 704 audio, active meeting 706 video, and active meeting 708 web components can be placed in the foreground and provided to user 702.

In this fashion, a user can participate in one conference as an audio-only participant, while viewing video from another conference, while text messaging responses in a third conference, for example. Further, the original participant "modality" can be transformed into a different modality for presentation to other conference participants. For example, the text messaging modality can be transformed into audio (e.g., by using a text-to-speech (TTS) engine) for the benefit of audio-only participants in another conference. That audio, in turn, can be converted back into a text messaging format (e.g., by using an automatic speech recognition (ASR) mechanism). Alternatively, the participant can receive the full audio "mix" from the active conference only. The participant can then convert any background conference to the active conference by using a "hot key" or other suitable feature code. The old active conference can be shifted to a text communication style. This approach can avoid the user becoming the active speaker across multiple conferences, and may instead restrict the user's audio to only the active conference.

Figure 8:
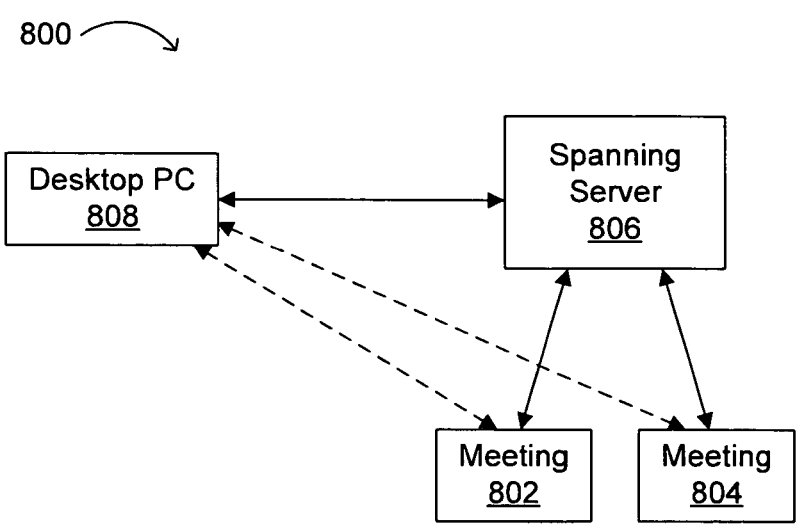
FIG. 8 is a block diagram illustrating spanning server and desktop options for control of a conference spanning system in accordance with embodiments of the present invention.

Referring now to FIG. 8, a block diagram illustrating spanning server and desktop options for control of a conference spanning system in accordance with embodiments of the present invention is indicated by the general reference character 800. In one aspect of embodiments, software for conference spanning can be loaded on a server (e.g., spanning server 806). Spanning server 806 may be, for example, a router configured by software to operate as a spanning server. Alternatively, a desktop PC (e.g., desktop PC 808) may be loaded with software to perform conference spanning functions. In this fashion, conferences (e.g., meeting 802 and meeting 804) can be spanned by a user of desktop PC 808, for example, as discussed above.

While examples of only two or four meetings have been shown, the concepts discussed herein are conceivably scalable, but may instead only be limited by how much a user can process in some applications. However, in other applications, such as an automatic cycling through or an automatic timer approach whereby each meeting in the system can become active for a designated length of time, followed by automatic transition to another meeting, there is no limit to the number of meetings that can be supported in accordance with embodiments.

Figure 9:
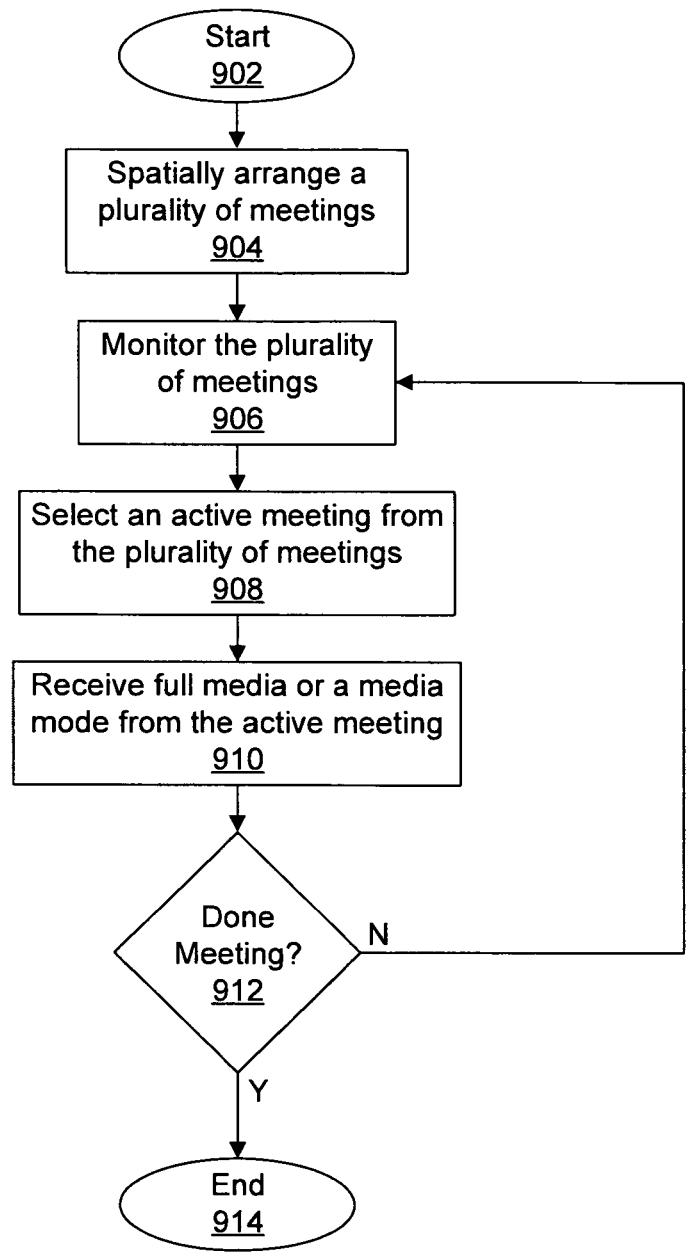
FIG. 9 is a flow diagram illustrating a first exemplary conference spanning method in accordance with an embodiment of the present invention.

Referring now to FIG. 9, a flow diagram illustrating a first exemplary conference spanning method in accordance with an embodiment of the present invention is indicated by the general reference character 900. The flow can begin (902) and a plurality of meetings can be spatially arranged (904). A user can monitor the plurality of meetings (906) and one of the meetings can be selected by the user to be an active meeting (908). The user can then receive full media or a media mode or component from the active meeting (910). If the user wishes to end the active meeting (912), the user can either return to monitoring the meetings (906) if the user intends to possibly enter another meeting or the flow can complete (914) if the user is done meeting for this particular conferencing session.

Figure 10:
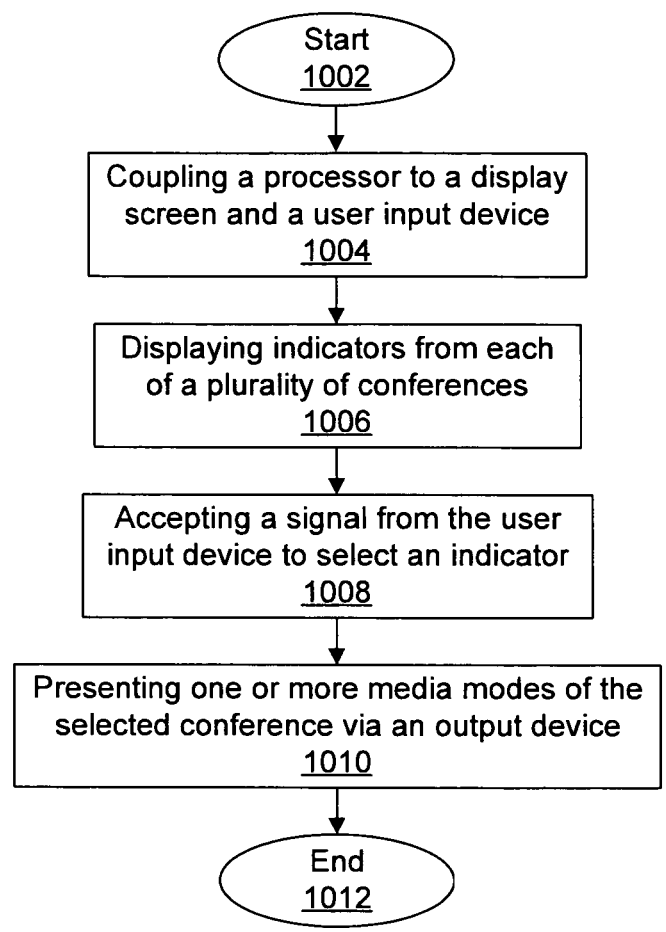
FIG. 10 is a flow diagram illustrating a second exemplary conference spanning method in accordance with an embodiment of the present invention.

Referring now to FIG. 10, a flow diagram illustrating a second exemplary conference spanning method in accordance with an embodiment of the present invention is indicated by the general reference character 1000. The flow can begin (1002) and a processor can be coupled to a display screen and a user input device (1004). The user input device can be any suitable type of user interface (e.g., GUI, TUI, or the like). Indicators from each of a plurality of conferences or meetings can be displayed (1006). A signal from the user input device can be accepted to select an indicator (1008). This selected indicator can accordingly correspond to a selected or active conference. A set of full media or a single media mode or component from the selected conference can be presented via an output device (1010) and the flow can complete (1012). The output device can be any device suitable for the particular media mode involved. For example, if only an audio media mode is selected, speakers may be a suitable output device. Similarly, for video (as well as other media modes), a monitor or the display screen can be a suitable output device.

In a particular video conference example, the user can, along with the audio options discussed above, have a conference name caption attached to the video. Such an approach can avoid confusion as to which conference the user is attending. In another example, a "tuner" can be attached to a voice stream for each conference. This can allow the user to listen to only one conference, but be able to watch all the conferences the user is associated with, at the same time. In this example, the voice component can be fixed on one conference, but spanned across video of other conferences. Accordingly, there may be no voice mixing in this particular situation, but the participant can receive, e.g., multiple video feeds, but only one audio feed, from the "active conference,".

According to embodiments, a user can choose to let a state be shown, such as: (i) active; (ii) inactive; (iii) busy in another meeting; and/or (iv) do not disturb. If the user is in a state to be contacted, the participant can be "woken up" (e.g., using alert mechanism 206 of FIG. 2) using any of the following approaches, for example: (i) hot word recognition (e.g., an ASR-based system that can monitor voice and alerts when the user's name is called); (ii) "star-codes" with the user's meeting profile identification to be dialed out to the system, which then alerts the user; (iii) moderator-initiated wake-up; and/or (iv) GUI button for web-based sessions.

Also, notifications can be sent to a user with the following elements, for example: (i) an in-band side/alerting tone to the user (e.g., a tone interactive voice response (IVR) message played to the user to gain the attention of the user); (ii) GUI flash/highlight on the screen of the user (e.g., the web, video, and/or text mode or component of that particular conference active on the user's screen can "flash" the user for attention); and/or (iii) video-highlighting (e.g., flash the video component of the conference or change the hues on the video to attract the attention of the user).

In this fashion, embodiments of the present invention can be used to facilitate the spanning of a plurality of conferences by accommodating participation in some conferences in a passive manner and at least one in an active manner. Such an approach in accordance with embodiments of the present invention can allow for a participant to effectively be present in more than one conference at the same time. Further, algorithms and/or methods in accordance with embodiments may also be used to differentiate "modalities" or media modes of a conference to allow participation as well as to distinguish between multiple conferences using a given media mode.

Accordingly, embodiments of the present invention pertain to the use of conference spanning techniques to facilitate participation in multiple conferences and include advantages in a media (e.g., video, audio, text, and/or web components) conferencing system of: (i) increasing productivity; and (ii) facilitating collaboration from multiple locales, for example.

While embodiments herein have been discussed with reference to certain media conferencing, embodiments of the present invention are not limited thereto. For example, many other types of media and associated interchange or communication may be used in accordance with embodiments of the present invention. Further, specific network arrangements and configurations shown herein are merely exemplary and one skilled in the art will recognize that other variations may be used in accordance with embodiments. Accordingly, variations and embodiments other than those discussed herein are possible.

Although embodiments of the invention are discussed primarily with reference to specific examples, any acceptable architecture, topology, protocols, network arrangement, forms of media, distribution arrangements, or other network and/or digital processing features can be employed. In general, network controllers, managers, access points, clients, and so on, can be implemented via any device with processing ability or other requisite functionality. It is also possible that functionality relevant to embodiments of the present invention can be included in a router, switch and/or other integrated device.

Although processes of the present invention, and the hardware executing the processes, may be characterized by language common to a discussion of the Internet (e.g., "client," "server," "peer") it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing or media presentation device can be used as a device suitable for a network connection as an endpoint. For example, portable computing devices such as a personal digital assistant (PDA), cell phone, laptop computer, or other devices can be employed. In general, the devices and manner of specific processing (including location and timing) are not critical to practicing important features of embodiments of the present invention.

Although embodiments of the present invention have been discussed primarily with respect to video conferencing associated with a network, such as the Internet, any suitable network, network topology, transmission protocols, sender-receiver devices and relationships, and other characteristics or properties of electronic devices, processes and transmission methods can be used. For example, features of the invention can be employed on various scales and in various applications, including local area networks (LANs), campus or corporate networks, home networks, etc.

Although the invention has been discussed with respect to specific embodiments thereof, these embodiments are merely illustrative, and not restrictive, of the invention. Embodiments of the present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data, may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A conference spanner, comprising:
    a presentation mechanism configured to present a plurality of conferences in a plurality of media modes at a same time, wherein the plurality of conferences are presented in a spatial arrangement to provide a distinction among the plurality of conferences to a user participating in the plurality of conferences, the distinction to the user being based on a varying level of intensity related to at least one of the plurality of media modes; and
    a selector mechanism configured to enable the user to select a first conference from the plurality of conferences to be a selected conference, wherein the user is enabled to indicate the selection by selecting any one of the plurality of media modes available for the first conference, and wherein:
        non-selected conferences of the plurality of conferences are designated as background conferences and presented to the user with intensities associated with plurality of media modes of the background conferences reduced in level compared to the intensities associated with the corresponding media modes of the selected conference, and
        based on being selected, the first conference is configured to be presented to the user as an active conference with an intensity associated with at least one media mode of the first conference enhanced in level in the presentation mechanism relative to intensities associated with corresponding media modes for each of the background conferences,
        wherein the plurality of conferences are spatially divided, the selected conference being presented from a front direction and the non-selected conferences being presented from a direction other than the front direction.

2. The conference spanner of claim 1, wherein the plurality of media modes includes web conferencing.

3. The conference spanner of claim 1, wherein the spatial arrangement includes a plurality of radial locations about the user to surround the user.

4. The conference spanner of claim 1, wherein a first audio for the selected conference is enhanced in level relative to a second audio for the background conferences by having an increase in volume level.

5. The conference spanner of claim 1, wherein the presentation mechanism includes a roster of participants in one or more of the plurality of conferences.

6. The conference spanner of claim 5, the presentation mechanism further including an alert mechanism configured to make contact with a prospective conference participant based on the roster of participants.

7. The conference spanner of claim 1, wherein the selector mechanism is configured to be operated without intervention by the user by cycling between the plurality of conferences.

8. The conference spanner of claim 1, wherein at least one of the plurality of conferences includes a distributed conference.

9. The conference spanner of claim 1, wherein:
    the selected conference is configured to send audio media of a first predetermined number of loudest speakers in the selected conference to the presentation mechanism; and
    each of the background conferences is configured to send audio media of a second predetermined number of loudest speakers to the presentation mechanism, wherein the second predetermined number is less than the first predetermined number.

10. The conference spanner of claim 1, wherein:
    the selector mechanism is configured to select one of the plurality of media modes of the first conference to make the first conference the active conference; and
    the first conference is configured to send each of the plurality of media modes to the presentation mechanism such that each media mode for the first conference is emphasized.

11. The conference spanner of claim 1, wherein:
    the selector mechanism is configured to select a plurality of conferences as active conferences; and
    each of the plurality of active conferences includes at least one enhanced media mode.

12. The conference spanner of claim 1, wherein the selector mechanism is further configured to designate a second conference from the background conferences as the active conference based upon receiving a user selection for the user selecting the second conference using the selector mechanism such that:
    the first conference is configured to be designated as a background conference such that the first conference is presented to the user with the intensities associated with the plurality of media modes for the first conference reduced to a level similar to the intensities associated with the plurality of media modes for other background conferences, and
    the second conference is configured to be presented to the user as the active conference with the intensity associated with at least one media mode of the second conference that is enhanced in the presentation mechanism relative to the intensities associated with corresponding media modes for each of the background conferences.

13. The conference spanner of claim 1, wherein the intensity associated with at least one media mode of the first conference that is enhanced in the presentation mechanism is selected from a group including a brightness associated with a visual display of the first conference, a contrast associated with a visual display of the first conference and a volume level associated with an audio of the first conference.

14. A method of managing a conference spanning system, the method being executable by a processor, wherein the processor is coupled to a display screen and a user input device, the method comprising:

displaying a plurality of indicators on the display screen, wherein each of the plurality of indicators corresponds to one of a plurality of conferences, wherein any one of a plurality of media modes available for a conference is selectable via the plurality of indicators, and wherein the plurality of media modes comprises audio, video, and text messaging;

accepting information from the user input device to select one of the plurality of indicators, wherein the information corresponds to a conference selected using the user input device;

designating the selected conference as an active conference;

designating non-selected conferences in the plurality of conferences as background conferences;

based on being selected as the active conference, presenting to the user at least one of the plurality of media modes of the selected conference via an output device with an intensity associated with at least one media mode enhanced in level relative to intensities associated with corresponding media modes for each of the background conferences; and presenting to the user, the background conferences via the output device with intensities associated with the plurality of media modes of the background conferences reduced compared to the intensities associated with the plurality of media modes of the selected conference, wherein the plurality of conferences are presented in a spatial arrangement via the output device to provide a distinction among the plurality of conferences to the user, the distinction to the user being based on a varying level of intensity related to at least one of the plurality of media modes, wherein the plurality of conferences are spatially divided, the selected conference being presented from a front direction and the non-selected conferences being presented from a direction other than the front direction.

15. The method of claim 14, further including configuring a spanning server using software, wherein the spanning server is used for the presenting of the plurality of media modes.

16. The method of claim 14, wherein a first audio for the selected conference is enhanced in level relative to a second audio for the background conferences by having an increase in volume level.

17. The method of claim 14, wherein the user input device is configured to provide the information based on a timer without intervention by the user.

18. The method of claim 14, wherein the presenting the at least one of the plurality of media modes includes a synchronization of the plurality of media modes.

19. The method of claim 14, wherein the displaying the plurality of indicators includes using a conference name caption denoting each of the plurality of conferences.

20. The method of claim 14, further including alerting a participant of one of the plurality of conferences to join the selected conference.

21. A non-transitory computer-readable medium including instructions that, when executed by one or more processors that are coupled to a display screen and a user input device, cause the processors to perform operations for managing a conference spanning system, the operations comprising:

displaying a plurality of indicators on the display screen, wherein each of the plurality of indicators corresponds to one of a plurality of conferences, wherein any one of a plurality of media modes available for a conference is selectable via the plurality of indicators, and wherein the plurality of media modes comprises audio, video, and text messaging;

accepting information from the user input device to select one of the plurality of indicators, wherein the information corresponds to a conference selected using the user input device;

designating the selected conference as an active conference;

designating non-selected conferences in the plurality of conferences as background conferences;

based on being selected as the active conference, presenting to the user at least one of the plurality of media modes of the selected conference via an output device with an intensity associated with at least one media mode enhanced in level relative to intensities associated with corresponding media modes for each of the background conferences; and presenting to the user, the background conferences via the output device with intensities associated with the plurality of media modes of the background conferences reduced compared to the intensities associated with the plurality of media modes of the selected conference, wherein the plurality of conferences are presented in a spatial arrangement via the output device to provide a distinction among the plurality of conferences to the user, the distinction to the user being based on a varying level of intensity related to at least one of the plurality of media modes, wherein the plurality of conferences are spatially divided, the selected conference being presented from a front direction and the non-selected conferences being presented from a direction other than the front direction.

22. An apparatus for managing a conference spanning system, the apparatus comprising:

means for displaying a plurality of indicators on a display screen, wherein each of the plurality of indicators corresponds to one of a plurality of conferences, wherein any one of a plurality of media modes available for a conference is selectable via the plurality of indicators, and wherein the plurality of media modes comprises audio, video, and text messaging;

a processor; and one or more instructions encoded in a non-transitory machine-readable medium for execution by the processor and when executed cause the processor to perform operations including:

accepting information from the user input device to select one of the plurality of indicators, wherein the information corresponds to a conference selected using the user input device;

designating the selected conference as an active conference;

designating non-selected conferences in the plurality of conferences as background conferences;

based on being selected as the active conference, presenting to the user at least one of the plurality of media modes of the selected conference via an output device with an intensity associated with at least one media mode enhanced in level relative to intensities associated with corresponding media modes for each of the background conferences; and presenting to the user, the background conferences via the output device with intensities associated with the plurality of media modes of the background conferences reduced compared to the intensities associated with the plurality of media modes of the selected conference, wherein the plurality of conferences are presented in a spatial arrangement via the output device to provide a distinction among the plurality of conferences to the user, the distinction to the user being based on a varying level of intensity related to at least one of the plurality of media modes, wherein the plurality of conferences are spatially divided, the selected conference being presented from a front direction and the non-selected conferences being presented from a direction other than the front direction.

23. A conference spanning system, comprising:

a presentation mechanism configured to present a plurality of conferences in a plurality of media modes at a same time, wherein the plurality of conferences are presented in a spatial arrangement to provide a distinction among the plurality of conferences to a user participating in the plurality of conferences, the distinction to the user being based on a varying level of intensity related to at least one of the plurality of media modes;

a selector mechanism configured to enable the user to select a first conference from the plurality of conferences, wherein the user is enabled to indicate the selection by selecting any one of the plurality of media modes available for the first conference, and wherein:

non-selected conferences of the plurality of conferences are designated as background conferences and are presented to the user with intensities associated with plurality of media modes of the background conferences reduced in level compared to the intensities associated with the plurality of media modes of the selected conference, and based on being selected, the first conference is configured to be presented to the user as an active conference with an intensity associated with at least one media mode of the first conference enhanced in level in the presentation mechanism relative to intensities associated with corresponding media modes for each of the background conferences, wherein the plurality of conferences are spatially divided, the selected conference being presented from a front direction and the non-selected conferences being presented from a direction other than the front direction; and a stream controller for controlling media streams for the plurality of conferences such that the presentation mechanism is configured to receive the plurality of media modes from the active conference and the background conferences based on the selection via the selector mechanism.

24. The conference spanning system of claim 23, wherein the plurality of media modes includes web conferencing.

25. The conference spanning system of claim 23, wherein the spatial arrangement includes a plurality of radial locations about the user.

26. The conference spanning system of claim 23, wherein the presentation mechanism includes a roster of participants in at least one of the plurality of conferences.

27. The conference spanning system of claim 26, the presentation mechanism further including an alert mechanism configured to make contact with a prospective conference participant based on the roster of participants.

28. The conference spanning system of claim 23, wherein the selector mechanism is configured to be operated without intervention by the user by cycling between the plurality of conferences.

29. The conference spanning system of claim 23, wherein the selected conference is configured to send audio media of a plurality of participants in the selected conference to the presentation mechanism; and each of the background conferences is configured to send audio media of one participant to the presentation mechanism, wherein the one participant has a volume associated with the audio media of the one participant that greater than a volume associated with audio media of any other participant in an associated background conference.

30. The conference spanning system of claim 23, wherein:

the selector mechanism is configured to select one of the plurality of media modes of one of the background conferences to make the selected conference the active conference, and send each of the plurality of media modes to the presentation mechanism via the stream controller such that each of the plurality of media modes for the selected conference is emphasized.

31. The conference spanning system of claim 23, wherein:

the selector mechanism is configured to select a plurality of active conferences; and each of the plurality of active conferences includes at least one enhanced media mode.

* * * * *